United States Patent Office 3,522,262
Patented July 28, 1970

3,522,262
5-(PYRIDYLALKYL)-PYRIDOINDOLE DERIVATIVES
Leo Berger, Montclair, and Alfred John Corraz, Wayne, N.J., assignors to Hoffmann-La Roche Inc., Nutley, N.J., a corporation of New Jersey
No Drawing. Filed Sept. 10, 1968, Ser. No. 758,712
The portion of the term of the patent subsequent to Nov. 5, 1985, has been disclaimed
Int. Cl. C07d 31/42
U.S. Cl. 260—296                 23 Claims

ABSTRACT OF THE DISCLOSURE 5-(pyridylalkyl)pyridoindole derivatives having antiallergic activity, prepared by the condensation of the correspondingly substituted 4-piperidones and N-amino-N-arylaminoalkylpyridines, are described.

BRIEF SUMMARY OF THE INVENTION

The invention relates to 5-(pyridylalkyl)pyridoindole derivatives, processes and intermediates for the preparation thereof. More particularly, the invention relates to compounds of the formula

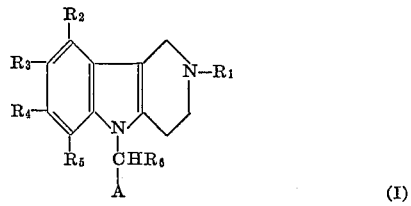

wherein $R_1$ is hydrogen, lower alkyl, benzoyl or benzyl; $R_2$, $R_3$, $R_4$ and $R_5$ are each independently hydrogen, halogen, lower alkyl, lower alkoxy, lower alkoxy-carbonyl, carboxy, hydroxymethyl or trifluoromethyl, provided that at least one of $R_2$, $R_3$, $R_4$ and $R_5$ is other than hydrogen; $R_6$ is hydrogen or lower alkyl; and A is

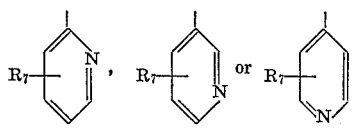

wherein $R_7$ is hydrogen or lower alkyl, and pharmaceutically acceptable acid addition salts thereof.

The compounds of Formula I are useful as antihistaminic and antiallergic agents.

DETAILED DESCRIPTION OF THE INVENTION

The end products of the invention are characterized by formula

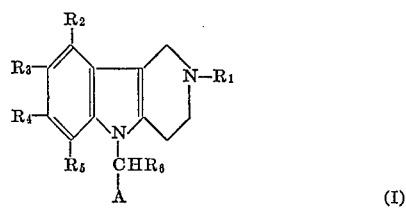

wherein $R_1$ is hydrogen, lower alkyl, benzoyl or benzyl; $R_2$, $R_3$, $R_4$ and $R_5$ are each independently hydrogen, halogen, lower alkyl, lower alkoxy, lower alkoxycarbonyl, carboxy, hydroxymethyl or trifluoromethyl, provided that at least one of $R_2$, $R_3$, $R_4$ and $R_5$ is other than hydrogen; $R_6$ is hydrogen or lower alkyl; and A is

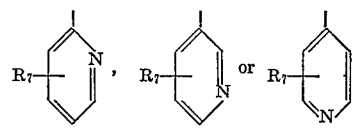

wherein $R_7$ is hydrogen or lower alkyl, and pharmaceutically acceptable acid addition salts thereof.

As used herein, the term "lower alkyl" is to be understood to means a straight or branched chain alkyl group of 1 to 6 carbon atoms, such as methyl, ethyl, isopropyl, butyl, pentyl, hexyl, and the like; methyl is preferred. The term "halogen" is to be understood to mean all of the halogens, i.e., bromine, chlorine, fluorine and iodine; bromine and chlorine are preferred. The term "lower alkoxy" is to be understood to mean a lower alkyl ether group in which the lower alkyl moiety is as described above, such as methoxy, ethoxy, propoxy, butoxy and the like; methoxy is preferred.

Illustrative of the compounds of Formula I are the following:

8-chloro-1,3,4,5-tetrahydro-2-methyl-5-(α-methyl-3-pyridylmethyl)-2H-pyrido[4,3-b]indole;
8-chloro-1,3,4,5-tetrahydro-2-methyl-5-(α-methyl-2-pyridylmethyl)-2H-pyrido[4,3-b]indole;
8-chloro-1,3,4,5-tetrahydro-2-methyl-5-[α-methyl-(6-methyl-2-pyridyl)methyl]-2H-pyrido[4,3-b]indole;
8-chloro-1,3,4,5-tetrahydro-2-methyl-5-[α-methyl-(6-methyl-3-pyridyl)methyl]-2H-pyrido[4,3-b]indole;
8-bromo-1,3,4,5-tetrahydro-2-methyl-5-(α-methyl-3-pyridylmethyl)-2H-pyrido[4,3-b]indole;
8-chloro-1,3,4,5-tetrahydro-2-methyl-5-(α-methyl-4-pyridylmethyl)-2H-pyrido[4,3-b]indole;
1,3,4,5-tetrahydro-2,8-dimethyl-5-(α-methyl-3-pyridylmethyl)-2-H-pyrido[4,3-b]indole;
1,3,4,5-tetrahydro-8-methoxy-2-methyl-5-(α-methyl-3-pyridylmethyl)-2H-pyrido[4,3-b]indole;
1,3,4,5-tetrahydro-2,7,8-trimethyl-5-(α-methyl-3-pyridylmethyl)-2H-pyrido[4,3-b]indole;
1,3,4,5-tetrahydro-2,8,9-trimethyl-5-(α-methyl-3-pyridylmethyl)-2H-pyrido[4,3-b]indole;
8-chloro-1,3,4,5-tetrahydro-2-methyl-5-(3-pyridylmethyl)-2H-pyrido[4,3-b]indole;
8-chloro-1,3,4,5-tetrahydro-2-methyl-5-(4-pyridylmethyyl)-2H-pyrido[4,3-b]indole; and
8-chloro-1,3,4,5-tetrahydro-2-methyl-5-(2-pyridylmethyl)-2H-pyrido[4,3-b]indole.

The novel end products of the invention, i.e., the compounds of Formula I, wherein one or more of $R_2$, $R_3$, $R_4$ or $R_5$ is other than carboxy or hydroxymethyl, can be prepared according to the procedure set forth in Reaction Scheme 1:

Scheme I

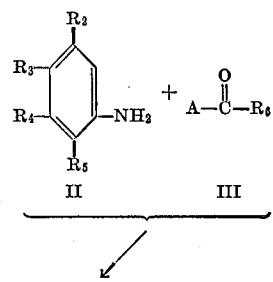

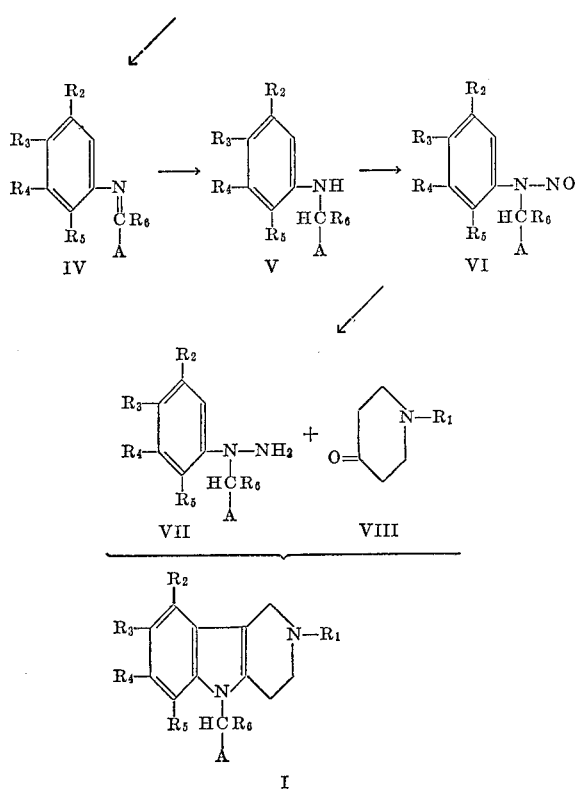

wherein $R_1$, $R_2$, $R_3$, $R_4$, $R_5$, $R_6$ and A are as previously described.

In Reaction Scheme I, a substituted aniline of Formula II, which are known compounds or are analogs of known compounds readily obtained by known procedures, is condensed with a pyridine aldehyde or pyridylalkyl ketone of Formula III, which are also known compounds or are analogs of known compounds readily obtained by known procedures, to yield the Schiff base of Formula IV. The condensation is carried out at reflux temperatures, preferably in the presence of an inert organic solvent such as, for example, benzene, toluene and the like. The condensation is suitably carried out at an elevated temperature, preferably at a temperature between about room temperature and the boiling point of the reaction mixture; the preferred temperature range is the reflux temperature of the reaction mixture. Conveniently, an acid catalyst such as paratoluenesulfonic acid and the like may be used to accelerate the reaction.

The Schiff base of Formula IV is converted to the arylaminoalkylpyridine of Formula V utilizing a reducing agent such as, for example, sodium borohydride, or a hydrogenation catalyst, e.g., palladium-on-carbon and the like. Conveniently, an inert organic solvent such as, for example, alkanols and the like, may be utilized. The reduction is suitably carried out at a temperature in the range of about 25 to 100° C.

The arylaminoalkylpyridine of Formula V is converted to the N-nitrosoamine of Formula VI utilizing a nitrosating agent such as, for example, nitrous acid, which can be conveniently prepared in situ from hydrochloric acid and sodium nitrite. The reaction is suitably carried out in the presence of an inert organic solvent, for example, a lower alkanol such as methanol, ethanol, propanol and the like, preferably at a low temperature, i.e., at a temperature between about 0° and about 25° C.

The N-nitrosoamine of Formula VI is converted to the N-amino-N-arylaminoalkylpyridine of Formula VII utilizing a reducing agent, preferably a mild reducing agent such as, for example, zinc. The reduction is suitably carried out in the presence of an aqueous acid at a temperature below room temperature, preferably between about 0° and 20° C.

The condensation of the N-amino-N-arylaminoalkylpyridine of Formula VII with the piperidone of Formula VIII, which are known compounds or are analogs of known compounds readily obtained by known procedures, to yield the 5-(pyridylalkyl)-pyridoindole of Formula I is suitably carried out in the presence of an inert organic solvent such as, for example, alkanols, benzene, toluene and the like. The condensation is suitably carried out at an elevated temperature, preferably at a temperature between about room temperature and the boiling point of the reaction mixture; most preferred are temperatures in the range between about 20° and 150° C.

The compounds of Formula I, wherein one or more of $R_2$, $R_3$, $R_4$ and $R_5$ is hydroxymethyl, can be prepared by treating the respective compound of Formula I, wherein correspondingly one or more of $R_2$, $R_3$, $R_4$ and $R_5$ is methoxycarbonyl, with a reducing agent such as, for example, lithium aluminum hydride and the like.

The compounds of Formula I, wherein one or more of $R_2$, $R_3$, $R_4$ and $R_5$ is carboxy, can be prepared by treating the respective compound of Formula I, wherein correspondingly one or more of $R_2$, $R_3$, $R_4$ and $R_5$ is methoxycarbonyl, with a hydrolyzing agent such as, for example, sodium hydroxide and the like.

Preferred end-products of the invention are characterized by the formula

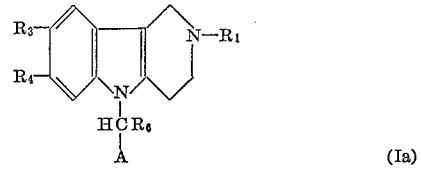

(Ia)

wherein $R_1$ is hydrogen, lower alkyl, benzoyl or benzyl; $R_3$ and $R_4$ are each independently hydrogen, halogen, lower alkyl, lower alkoxycarbonyl, carboxy, lower alkoxy, hydroxymethyl or trifluoromethyl, provided that at least one of $R_3$ or $R_4$ is other than hydrogen; $R_6$ is hydrogen or lower alkyl; and A is

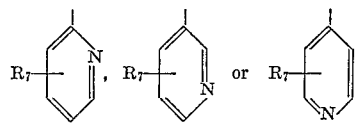

wherein $R_7$ is hydrogen or lower alkyl and their pharmaceutically acceptable acid addition salts. Of these, the more preferred are those wherein $R_1$ is methyl, $R_3$ and $R_4$ are chloro, bromo or methyl and $R_6$ is methyl and the most preferred are those wherein $R_1$ is methyl, $R_3$ is chloro, bromo or methyl, $R_4$ is hydrogen and $R_6$ is methyl.

The compounds of Formula I form acid addition salts and such salts are also within the scope of the invention. The compounds of Formula I form pharmaceutically acceptable acid addition salts with both pharmaceuticlly acceptable organic and inorganic acids. Suitable organic acids are, for example, maleic acid, fumaric acid, ascorbic acid, tartaric acid, salicylic acid, succinic acid, citric acid and the like. Suitable inorganic acids are, for example, the hydrohalic acids, e.g. hydrochloric acid and hydrobromic acid, sulfuric acid, sulfamic acid, phosphoric acid and the like. The acid addition salts are readily obtainable by the usual techniques for the preparation of salts from acids.

The compounds of Formula I of the present invention can be formulated, using conventional inert pharmaceutical adjuvant materials, into dosage forms which are suitable for oral or parenteral administration. Such dosage forms include tablets, suspensions, solutions, etc. Furthermore, the compounds of this invention can be embodied into and administered in the form of suitable hard or soft capsules. The identity of the inert adjuvant materials which are used in formulating the present compounds into oral and parenteral dosage forms will be immediately apparent to persons skilled in the art. These adjuvant materials, either inorganic or organic in nature, include, for example, water, gelatin, lactose, starch, magnesium stearate, talc, vegetable oils, gums, polyalkylene glycols, etc. Moreover, preservatives, stabilizers, wetting agents, emulsifying agents, salts for altering osmotic pressure, buffers, etc., can be incorporated, if desired, into such formulations.

The compounds of Formula I and their pharmaceutically acceptable acid addition salts are distinguishable by their antiallergic activity, more particularly their antihistaminic activity, and therefore are useful antihistaminic agents. Particularly pronounced is the antiallergic activity of 8 - chloro - 1,3,4,5-tetrahydro-2-methyl-5-(α-methyl-3-pyridylmethyl)-2H-pyrido-[4,3-b]indole and 8-chloro-1,3,4,5 - tetrahydro - 2 - methyl-5-(2-pyridylmethyl)-2H-pyrido[4,3-b]indole.

The useful antihistaminic activity of the compounds of Formula I is demonstrated in warm-blooded animals utilizing the standard procedures. For example, five to ten guinea pigs per dose level are orally administered the test compound one hour before intracardial injection of histamine. A 0.55 percent solution of histamine diphosphate is administered at a level of 1 mg./kg. ($LD_{100}$) dose. The percent protection from death is used to determine the $ED_{50}$ value for the test compound. $ED_{50}$'s are calculated by the Miller and Tainter method (Proc. Soc. Exptl. Biol. Med. 57: 261, 1944).

When 8-chloro-1,3,5-tetrahydro-2-methyl-5-(2-pyridylmethyl)-2H-pyrido[4,3-b]indole, which has demonstrated an $LD_{50}$ of 354 mg./kg. p.o., is utilized as the test substance, an $ED_{50}$ of 0.17 is obtained.

When 8 - chloro - 1,3,4,5 - tetrahydro-2-methyl-5-(α-methyl-3-pyridylmethyl)-2H-pyrido[4,3-b]indole is utilized as the test substance, an $ED_{50}$ of 0.19 is obtained.

The compounds of the Formula I and their pharmaceutically acceptable acid addition salts have effect qualitatively similar to those of chlorpheniramine, known for its therapeutic use and properties. Thus, the compounds of the Formula I demonstrate a pattern of activity associated with anti-allergics of known efficacy and safety.

The percentage of active ingredient in the compositions of the invention may be varied, it being necessary that it should constitute a proportion such that a suitable dosage for the therapeutic effect desired in the species of animal shall be obtained. Obviously, several unit dosage forms may be administered at about the same time.

The following nonlimiting examples further illustrate the invention. All parts are by weight and all temperatures are in degrees centigrade, unless otherwise mentioned.

EXAMPLE 1

Preparation of 3-[α-methyl-(4-chloroanilino) methyl]pyridine

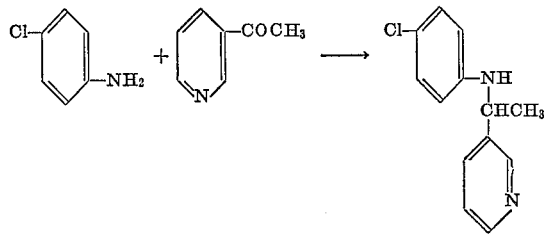

A mixture of 102 g. of p-chloroaniline, 100 g. of 3-acetylpyridine, 100 mg. of p-toluenesulfonic acid and 600 ml. of benzene was stirred at reflux temperature for 48 hours. The theoretical quantity of water from the reaction was removed by means of a Dean-Stark trap and the reaction mixture was concentrated to a syrup under reduced pressure. The resultant Schiff's base was dissolved in 400 ml. of ethanol. To this solution was added a suspension of 60 g. of sodium borohydride in 400 ml. of ethanol over the course of 2 hours. The reaction mixture was then refluxed for 2½ hours and allowed to stand at room temperature overnight.

The solution was then steam distilled to remove any unreacted starting materials and the residue was thoroughly extracted with ether (4×250 ml.). The ether solution was dried over anhydrous sodium sulfate, filtered and concentrated to dryness. The solid residue was crystallized from a mixture of ethyl acetate and hexane to give 70 g. of 3-[α-methyl-(4-chloroanilino)methyl]pyridine, M.P. 121–122°.

The base (10.0 g.) was dissolved in ethanol.) A slight excess (2.2 moles) of alcoholic hydrogen chloride was added and the solution set in the refrigerator overnight. The precipitate obtained was filtered and recrystallized from ethanol to yield 10.0 g. of 3-[α-methyl-(4-chloroanilino)methyl]pyridine dihydrochloride melting at 182–184°.

By the same procedure as is described in detail in this example, the following compounds were prepared:

3-[α-methyl-(p-toluidino)methyl]pyridine, melting at 113°, its dihydrochloride salt melting at 187° [from p-toluidine and 3-acetylpyridine];

3-[α-methyl-(p-bromoanilino)methyl]pyridine, melting at 131°, its dihydrochloride salt melting at 193–194° [from p-bromoaniline and 3-acetylpyridine];

3-[α-methyl-(p-methoxyanilino)methyl]pyridine, melting at 70–71.5° [from p-anisidine and 3-acetylpyridine];

3-[α-methyl-(3,4-dimethylanilino)methyl]pyridine, melting at 91.5–92.5° [from 3,4-dimethylaniline and 3-acetylpyridine];

2-[α-methyl-(4-chloroanilino)methyl]pyridine, melting at 93–94.5°, its dihydrochloride salt melting at 139–142° [from 2-acetylpyridine and p-chloroaniline];

2 - [α-methyl-(4-chloroanilino)methyl] - 6 - methylpyridine, melting at 95–96°, its dihydrochloride salt melting at 219–220° [from 2-acetyl-6-methylpyridine and p-chloroaniline];

5-[α-methyl(4-chloroanilino)methyl] - 2 - methylpyridine, melting at 114–115° [from 2-methyl-5-acetylpyridine and p-chloroaniline];

3-[α-methyl(4-chloroanilino)methyl] - 4 - methylpyridine, melting at 137–138° [from 3-acetyl-4-methylpyridine and p-chloroaniline];

4-[α-methyl-(4-chloroanilino)methyl]pyridine, melting at 107–108°, its dihydrochloride salt melting at 196–198° [from 4-acetylpyridine and p-chloroaniline].

EXAMPLE 2

Preparation of 3-[α-methyl-(4-chloro-N-nitrosoanilino) methyl]pyridine

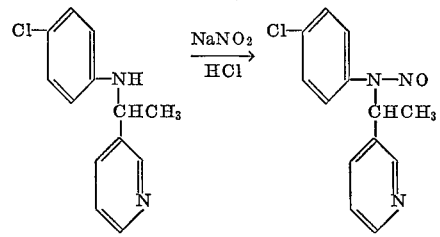

3-[α-methyl-(4-chloroanilino)methyl]pyridine (73 g.) was dissolved in 333 ml. of ethanol containing 333 ml. of 1 N hydrochloric acid and cooled to 5° in an ice bath. To this cooled solution was added a solution of 24 g. of sodium nitrite in 166 ml. of water over the course of 1 hr. The temperature was kept between 5–10° during the addition. After the addition was completed, the temperature was allowed to rise to room temperature and the reaction mixture was set aside at room temperature for 18 hours. The oil that separated from the reaction mixture was dissolved in ether and the reaction mixture was thoroughly extracted with ether (4×250 ml.). After drying overnight over anhydrous sodium sulfate the ether solution was concentrated to dryness to yield 58 g. of 3-[α-methyl-(4-chloro-N-nitrosoanilino)methyl]pyridine as a thick syrup.

By the same procedure as described in detail in this example, the following compounds were prepared:

3 - [α - methyl-(p-methyl-N-nitrosoanilino)methyl]pyridine from 3-[α-methyl-(p-toluidino)methyl]pyridine;

3 - [α-methyl-(p-bromoanilino)methyl]pyridine from 3-[α - methyl - (p-bromo-N-nitrosoanilino)methyl]pyridine;

3 - [α - methyl-(p-methoxy-N-nitrosoanilino)methyl]pyridine from 3 - [α-methyl-(p-methoxyanilino)methyl]pyridine;

3 - [α-methyl-(3,4-dimethyl-N-nitrosoanilino)methyl]pyridine from 3-[α-methyl-(3,4-dimethylanilino)methyl]pyridine;

2 - [α - methyl-(4-chloro-N-nitrosoanilino)methyl]pyridene from 2-[α-methyl-(4-chloroanilino)methyl]pyridine;

2 - [α-methyl-(4-chloro-N-nitrosoanilino)methyl] - 6-methylpyridine from 2-[α-methyl(4-chloroanilino)methyl]-6-methylpyridine;

5 - [α-methyl-(4-chloro-N-nitrosoanilino)methyl] - 2-methylpyridine from [5-α-methyl-(4-chloroanilo)methyl]-2-methylpyridine;

3-[α-methyl-(4-chloro-N-nitrosoanilino)methyl] - 4-methylpyridine from [3-α-methyl-(4-chloroanilino)methyl]-4-methylpyridine;

4 - [α - methyl-(4-chloro-N-nitrosoanilino)methyl]pyridine from 4-[α-methyl-(4-chloroanilino)methyl]pyridine.

EXAMPLE 3

Preparation of 3-[α-methyl-(4-chloro-N-aminoanilino)methyl]pyridine

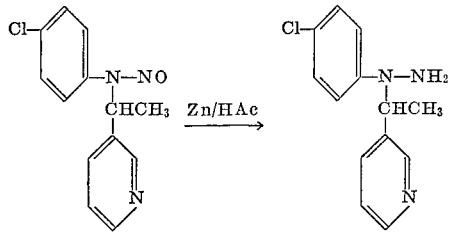

Over the course of 2 hours 133 g. of zinc dust was added portionwise to a stirred solution of 58 g. of 3-[α-methyl - (4-chloro-N-nitrosoanilino)methyl]pyridine in 250 ml. glacial acetic acid and 75 ml. of water. During the addition of the zinc the temperature of the reaction mixture was held between 0–5° by means of an ice-salt bath. After the addition, the mixture was stirred for 1 hour at 5° and then for 1 hour at 35°. Water (350 ml.) was then added and the reaction mixture was filtered. The filter cake was washed several times with water and the filtrate and the washings were combined. Ice (400 g.) was added and the mixture was made strongly alkaline with 6 N sodium hydroxide. The alkaline mixture was extracted with ether (4×250 ml.) and the ether extracts were combined and washed with water (4×100 ml.). When the ether solution had dried overnight over anhydrous sodium sulfate, the desiccant was removed by filtration and the ether was removed by evaporation. 39 g. of 3-[α-methyl-(4-chloro-N-aminoanilino)methyl]pyridine as a thick syrup was obtained.

By the same procedure as described in detail in this example, the following compounds were prepared:

3 - [α - methyl-(p-methyl-N-aminoanilino)methyl]pyridine from 3 - [α-methyl-(p-methyl-N-aminoanilino)methyl]pyridine;

3 - [1-[α-methyl-(p-bromo-N-aminoanilino)methyl]pyridine from 3-[α-methyl-(p-bromo-N-nitrosoanilino)methyl]pyridine;

3 - [α - methyl-(p-methoxy-N-aminoanilino)methyl]pyridine from 3-[α-methyl-(p-methoxy-N-nitrosoanilino)methyl]pyridine;

3 - [α - methyl-(3,4-dimethyl-N-nitrosoanilino)methyl]pyridine from 3 - [α-methyl-(3,4-dimethyl-N-aminoanilino)methyl]pyridine;

2 - [α-methyl-(4-chloro-N-aminoanilino)methyl]pyridine from 2 - [α-methyl-(4-chloro-N-nitrosoanilino)methyl]pyridine;

2 - [α - methyl-(4-chloro-N-aminoanilino)methyl] - 6-methylpyridine from 2 - [α-methyl-(4-chloro-N-nitrosoanilino)methyl]-6-methylpyridine;

5 - [α - methyl-(4-chloro-N-aminoanilino)methyl] - 2-methylpyridine from 5 - [α-methyl-(4-chloro-N-nitrosoanilino)methyl]-2-methylpyridine;

3 - [1-(4-chloro-N-aminoanilino)ethyl]-4-methylpyridine from 3-[α-methyl-(4-chloro-N-nitrosoanilino)methyl]-4-methylpyridine;

4 - [α - methyl - (4-chloro-N-aminoanilino)methyl]pyridine from 4 - [α-methyl-(4-chloro-N-nitrosoanilino)-methyl]pyridine.

EXAMPLE 4

Preparation of 8-chloro-1,3,4,5-tetrahydro-2-methyl-5-(α-methyl-3-pyridylmethyl)-2H-pyrido[4,3-b]indole

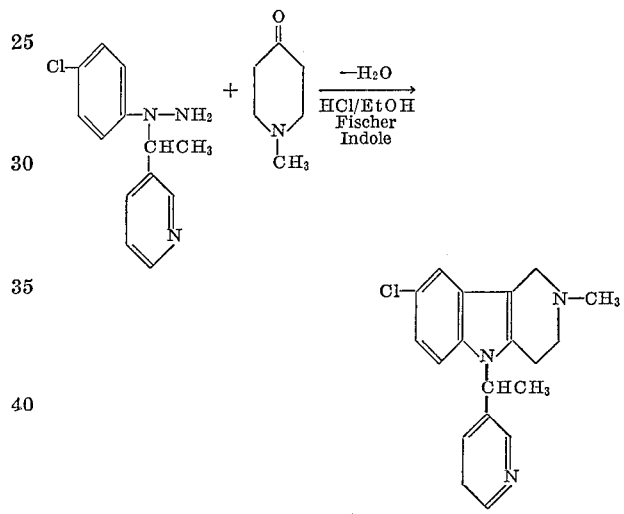

A stirred mixture of 14 g. of 3-[α-methyl-(4-chloro-N-aminoanilino)methyl]pyridine, 7.5 g. of 1-methylpiperidone-4 and 75 ml. of benzene was heated to reflux. After 24 hours under reflux 0.9 ml. of water was removed from the reaction mixture by means of a Dean-Stark trap and the reaction mixture was concentrated to dryness under reduced pressure. To the stirred residue 56 ml. of 6 N alcoholic hydrogen chloride was added in small portions (5 ml.). After the addition was complete the reaction mixture was refluxed for 0.5 hour, allowed to cool to room temperature and poured onto ice (200 g.). Sodium hydroxide (6 N) was added until the pH was greater than 10 and the alkaline mixture was extracted with ether (3×200 ml.). The ether extracts were combined and dried over anhydrous sodium sulfate overnight. The desiccant was removed by filtration and the ether solution was concentrated to dryness to yield 18 grams of solid 8 - chloro - 1,3,4,5 - tetrahydro-2-methyl-5-(α-methyl-3-pyridylmethyl)-2H-pyrido[4,3-b]indole melting at 107–108°. A small portion was recrystallized from hexane and melted at 108.5–110° U.V.

$\lambda_{max.}^{isopropanol}$ 232 m$\mu$

The base (5.0 g.) was dissolved in ethanol and an excess (2.2 moles) of 6 N alcoholic hydrogen chloride was added followed by several volumes of ethyl acetate. The solution was set in the refrigerator at 5° for several hours and the precipitate that separated was collected by filtration. Recrystallized from a mixture of ethyl acetate and ethanol 5.5 g. of 8-chloro-1,3,4,5-tetrahydro-2-methyl - 5 - (α-methyl-3-pyridylmethyl)-2H-pyrido[4,3-b]indole dihydrochloride was obtained, M.P. 223–225°.

To 1.4 g. of the base dissolved in 10 ml. of warm ethanol was added a solution of 1.0 g. of maleic acid dissolved in 10 ml. of a 50 percent ethanol-ether mixture. An additional 5 ml. of ether was added carefully to induce crystallization and the mixture was set in the refrigerator for 18 hours to complete the crystallization. The precipitate was filtered and dried to yield 1.5 g. of 8 - chloro-1,3,4,5-tetrahydro-2-methyl-5-(α-methyl-3-pyridylmethyl)-2H-pyrido[4,3-b]indole maleate, M.P. 130–131°.

By a procedure analogous to that described in detail in this example, and utilizing in place of 3-[α-methyl-(4-chloro-N-aminoanilino)methyl]pyridine, a reactant of the formula

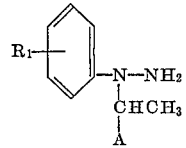

the following compounds were prepared:

| Reactant | | Product | Melting or Boiling Point |
|---|---|---|---|
| R₁ | A | | |
| 4-chloro | pyridin-3-yl | 8-chloro-1,3,4,5-tetrahydro-2-methyl-5-(α-methyl-2-pyridylmethyl)-2H-pyrido[4,3-b]indole. | M.P. 110°–111°. |
| | | The maleate salt | M.P. 154°–156°. |
| Do | 6-methyl-2-pyridyl | 8-chloro-1,3,4,5-tetrahydro-2-methyl-5-[α-methyl-(6-methyl-2-pyridyl)methyl]-2H-pyrido[4,3-b]indole. | B.P. 214°–216° 0.4 mm. |
| | | The dihydrochloride salt | M.P. 259°–261°. |
| Do | 6-methyl-3-pyridyl | 8-chloro-1,3,4,5-tetrahydro-2-methyl-5-[α-methyl-(6-methyl-3-pyridyl)methyl]-2H-pyrido[4,3-b]indole. | B.P. 217°/0.8 mm. |
| | | The maleate salt | M.P. 184°–185°. |
| 4-bromo | 3-pyridyl | 8-bromo-1,3,4,5-tetrahydro-2-methyl-5-(α-methyl-3-pyridylmethyl)-2H-pyrido[4,3-b]indole. | B.P. 230°–248°/0.15 mm. |
| | | The maleate salt | M.P. 165°–167°. |
| 4-chloro | 4-pyridyl | 8-chloro-1,3,4,5-tetrahydro-2-methyl-5-(α-methyl-4-pyridylmethyl)-2H-pyrido[4,3-b]indole. | M.P. 191°–192°. |
| | | The dimaleate hemihydrate salt | M.P. 125°–126°. |
| 4-CH₃ | 3-pyridyl | 1,3,4,5-tetrahydro-2,8-dimethyl-5-(α-methyl-3-pyridylmethyl)-2H-pyrido[4,3-b]indole. | B.P. 215°–225°/0.05 mm. |
| | | The maleate salt | M.P. 171°–173°. |
| 4-CH₃O | 3-pyridyl | 1,3,4,5-tetrahydro-8-methoxy-2-methyl-5-(α-methyl-3-pyridylmethyl)-2H-pyrido[4,3-b]indole. | B.P. 225°/0.2 mm. |
| | | The maleate salt | M.P. 175°–176°. |
| 3,4-dimethyl | 3-pyridyl | 1,3,4,5-tetrahydro-2,7,8-trimethyl-5-(α-methyl-3-pyridylmethyl)-2H-pyrido[4,3-b]indole. | B.P. 205°–210°/0.3 mm. |
| | | The maleate salt | M.P. 191°–192°. |
| Do | 3-pyridyl | 1,3,4,5-tetrahydro-2,8,9-trimethyl-5-(α-methyl-3-pyridylmethyl)-2H-pyrido[4,3-b]indole. | |
| | | The maleate salt | M.P. 182°–183°. |

EXAMPLE 5

Preparation of 3-(4-chloroanilinomethyl)pyridine

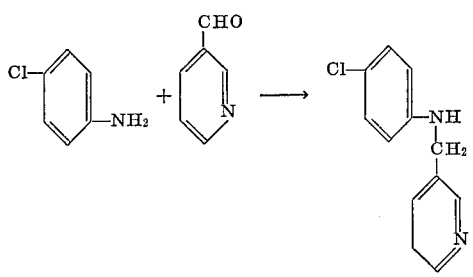

A mixture of 60 g. of p-chloroaniline, 50 g. of 3-pyridyl-aldehyde, 100 mg. of p-toluenesulfonic acid and 300 ml. of benzene was stirred and refluxed for 24 hours. By means of a Dean-Stark trap 7 ml. of water was removed from the refluxing mixture during this time and the reaction mixture was then concentrated to dryness under reduced pressure. To the stirred residue dissolved in 250 ml. of ethanol was added 55 g. of sodium borohydride suspended in 400 ml. of ethanol over the course of two hours. Upon completion of the addition, the reaction mixture was refluxed for 3 hours and then steam distilled for 8 hours to remove any unreacted materials. The solution was then cooled to room temperature and set in the refrigerator for crystallization. The crystalline 3-(4-chloroanilinomethyl)pyridine (85.2 g.) was collected by filtration, M.P. 95–96°. A small portion was recrystallized from ethylacetate and hexane and melted at 98–99°.

The base (5.0 g.) was dissolved in warm ethanol and an excess of 8 N alcoholic hydrogen chloride was added and the mixture was set in the refrigerator to complete the crystallization. The precipitate obtained was filtered and dried yielding 4.5 g. of 3-(4-chloroanilinomethyl)pyridine dihydrochloride, M.P. 170°.

By the same procedure as is described in detail in this example, the following compounds were prepared:

2-(4-chloroanilinomethyl)pyridine, melting at 87°, its hydrochloride salt melting at 170° [from p-chloroaniline and 2-pyridylaldehyde];
4-(4-chloroanilinomethyl)pyridine, melting at 93–94°, its dihydrochloride salt melting at 191–192° [from p-chloroaniline and 4-pyridylaldehyde];
4-(p-toluidinomethyl)pyridine, melting at 73–74°, its dihydrochloride salt melting at 193–194° [from 4-pyridylaldehyde and p-toluidine].

EXAMPLE 6

By the same procedure as is described in detail in Example 2, the following compounds were prepared:

2-(4-chloro-N-nitrosoanilinomethyl)pyridine, from 2-(4-chloroanilinomethyl)pyridine;
4 - (4 - chloro-N-nitrosoanilinomethyl)pyridine, from 4-(4-chloroanilinomethyl)pyridine;
4-(p-methyl-N-nitrosoanilinomethyl)pyridine, from 4-(p-toluidinomethyl)pyridine.

EXAMPLE 7

By the same procedure as is described in detail in Example 3, the following compounds were prepared:

2-(4-chloro-N - aminoanilinomethyl)pyridine from 2-(4-chloro-N-nitrosoanilinomethyl)pyridine;
4-(4-chloro-N-aminoanilinomethyl)pyridine from 4-(4-chloro-N-nitrosoanilinomethyl)pyridine;
4 - (p-methyl-N-aminoanilinomethyl)pyridine from 4-(p-methyl-N-nitrosoanilinomethyl)pyridine.

EXAMPLE 8

By the same procedure as is described in detail in Example 4, the following compounds were prepared:

8-chloro - 1,3,4,5-tetrahydro - 2 - methyl - 5 - (3-pyridylmethyl)-2H-pyrido[4,3-b]indole, melting at 119–120°, it is maleate salt melting at 191–192°, from 3-(4-chloro-N-aminoanilinomethyl)pyridine;
8-chloro-1,3,4,5 - tetrahydro - 2 - methyl - 5 - (4-pyridylmethyl)-2H-pyrido[4,3-b]indole, melting at 138–139°, its dihydrochloride salt melting at 208–209°, from 4-(4-chloro-N-aminoanilinomethyl)pyridine; and
8-chloro-1,3,4,5-tetrahydro-2-methyl-5-(2 - pyridylmethyl) - 2H - pyrido[4,3-b]indole, melting at 95–96°, its maleate salt melting at 189–190°, from 2-(4-chloro-N-amino-anilinomethyl)pyridine.

EXAMPLE 9

Pharmaceutical formulations incorporating representative products of this invention were prepared as follows:

Tablet formulation

| | Per tablet, mg. |
|---|---|
| 8 - chloro-1,3,4,5-tetrahydro-2-methyl-5-(α-methyl-3 - pyridylmethyl)-2H-pyrido-[4,3-b]indole dihydrochloride | 10.0 |
| Lactose | 129.0 |
| Corn starch | 50.0 |
| Pregelatinized corn starch | 8.0 |
| Calcium stearate | 3.0 |
| Total weight | 200.0 |

Procedure (1) 8 - chloro-1,3,4,5-tetrahydro-2-methyl-5-(α-methyl-3 - pyridylmethyl)-2H-pyrido[4,3-b]indole dihydrochloride, lactose, corn starch and pregelatinized corn starch were mixed in a suitable mixer.

(2) The mix was passed through a Fitzpatrick Comminuting Machine fitted with No. 1A screen and with knives forward.

(3) The mixture was returned to the mixer and moistened with water to a thick paste. The moist mass was passed through a No. 12 screen, and the moist granules were dried on paper lined trays at 110° F.

(4) The dried granules were returned to the mixer, and the calcium stearate was added and mixed well.

(5) The granules were compressed at a tablet weight of 200 mg. using standard concave punches having a diameter of 5⁄16″.

Capsule formulation

| | Per capsule, mg. |
|---|---|
| 8 - chloro - 1,3,4,5-tetrahydro-2-methyl-5-(2-pyridylmethyl)-2H-pyrido-[4,3-b]indole maleate | 25.5 |
| Lactose | 159.5 |
| Corn starch | 30.0 |
| Talc | 5.0 |
| Total net weight | 220.0 |

Procedure (1) 8-chloro - 1,3,4,5 - tetrahydro-2-methyl-5-(2-pyridylmethyl) - 2H - pyrido[4,3-b]indole maleate, lactose and corn starch were mixed in a suitable mixer.

(2) The mixture was passed through a Fitzpatrick Comminuting Machine using a No. 1A screen and knives forward.

(3) The mixture was returned to the mixer and the talc added. It was blended well and filled into No. 4 two-piece, hard gelatin capsules on a Parke-Davis capsulating machine. (Any similar type capsulating machine may be used).

Suppository formulation

Per 1.3-gm. suppository, gm.
8-chloro - 1,3,4,5 - tetrahydro - 2 - methyl-5-(α-methyl-3-pyridylmethyl)-2H-pyrido - [4,3-b]indole dihydrochloride _____ 0.025
Wecobee M (produced by E. F. Drew Co., 522 Fifth Ave., New York 10, N.Y.) _____ 1.230
Carnauba wax _____ 0.045

Procedure (1) The Wecobee M and the carnauba wax were melted in a suitable size glass lined container, mixed well and cooled to 45° C.

(2) 8 - chloro - 1,3,4,5 - tetrahydro - 2 - methyl-5-(α-methyl-3-pyridylmethyl)-2H - pyrido[4,3-b]indole dihydrochloride, which had been reduced to a fine powder with no lumps, was stirred until completely and uniformly dispersed.

(3) The mixture was poured into suppository molds to yield suppositories having an individual weight of 1.3 gms.

(4) The suppositories were cooled and removed from molds. They were then individually wrapped in wax paper for packaging.

Parenteral formulation, per ampul 8-chloro - 1,3,4,5 - tetrahydro - 2 - methyl-5-(2-pyridylmethyl)-2H-pyrido-[4,3-b]indole maleate—5.0 mg.
Propylene glycol—0.4 cc.
Benzyl alcohol (benzaldehyde free)—0.015 cc.
Ethanol 95 U.S.P.—0.10 cc.
Sodium benzoate—48.8 mg.
Benzoic acid—1.2 mg.
Water for injection, q.s.—1.0 cc.

Procedure (1) 50 grams of 8-chloro-1,3,4,5-tetrahydro-2-methyl-5-(2-pyridylmethyl) - 2H - pyrido[4,3-b]indole maleate were dissolved in 150 cc. of benzyl alcohol; 4,000 cc. of propylene glycol and 1,000 cc. of ethanol were added.

(2) The 12 grams of benzoic acid were dissolved in the above. The 488 grams of sodium benzoate dissolved in 3,000 cc. of water for injection were added. The solution was brought up to final volume of 10,000 cc. with water for injection.

(3) The solution was filtered through an 02 Selas candle, filtered into suitable size ampuls, gassed with $N_2$ and sealed. It was then autoclaved at 10 p.s.i. for 30 minutes.

We claim:
1. A compound of the formula

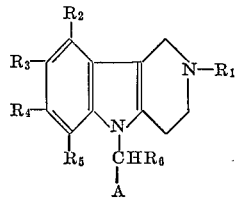

wherein $R_1$ is hydrogen, lower alkyl, benzoyl or benzyl; $R_2$, $R_3$, $R_4$ and $R_5$ are each independently hydrogen, halogen, lower alkyl, lower alkoxy, lower alkoxycarbonyl, carboxy, hydroxymethyl or trifluoromethyl, provided that at least one of $R_2$, $R_3$, $R_4$ and $R_5$ is other than hydrogen; $R_6$ is hydrogen or lower alkyl; and A is

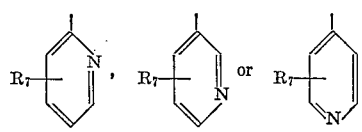

wherein $R_7$ is hydrogen or lower alkyl,
and pharmaceutically acceptable acid addition salts thereof.

2. A compound in accordance with claim 1, wherein $R_2$ and $R_5$ are hydrogen.

3. A compound in accordance with claim 2, wherein $R_1$ and $R_6$ are methyl.

4. A compound in accordance with claim 2, wherein $R_1$ is methyl and $R_6$ is hydrogen.

5. A compound in accordance with claim 3, wherein A is

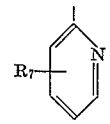

6. A compound in accordance with claim 5, wherein $R_3$ is chloro; $R_4$ is hydrogen and $R_7$ is 6-methyl, i.e., 8-chloro-1,3,4,5-tetrahydro-2-methyl-5-[α-methyl-(6-methyl 2-pyridyl)methyl]-2H-pyrido[4,3-b]indole.

7. A compound in accordance with claim 5, wherein $R_3$ is chloro and $R_4$ and $R_7$ are hydrogen, i.e., 8-chloro-1,3,4,5 - tetrahydro - 2 - methyl-5-(α-methyl-2-pyridylmethyl)-2H-pyrido[4,3-b]indole.

8. A compound in accordance with claim 4, wherein A is

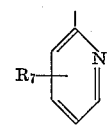

9. A compound in accordance with claim 8, wherein $R_3$ is chloro and $R_4$ and $R_7$ are hydrogen, i.e., 8-chloro-1,3,4,5 - tetrahydro - 2-methyl-5-(2-pyridylmethyl)-2H-pyrido[4,3-b]indole.

10. A compound in accordance with claim 3, wherein A is

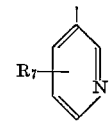

11. A compound in accordance with claim 10, wherein $R_3$ is chloro; $R_4$ is hydrogen and $R_7$ is 6-methyl, i.e. 8-chloro - 1,3,4,5 - tetrahydro - 2-methyl-5-[α-methyl-(6-methyl-3-pyridyl)methyl]-2H-pyrido-[4,3-b]indole.

12. A compound in accordance with claim 10, wherein $R_3$ is chloro and $R_4$ and $R_7$ are hydrogen, i.e., 8-chloro-1,3,4,5 - tetrahydro - 2 - methyl - 5-(α-methyl-3-pyridylmethyl)-2H-pyrido[4,3-b]indole.

13. A compound in accordance with claim 10, wherein $R_3$ is bromo and $R_4$ and $R_7$ are hydrogen, i.e., 8-bromo-1,3,4,5 - tetrahydro - 2 - methyl-5-(α-methyl-3-pyridylmethyl)-2H-pyrido[4,3-b]indole.

14. A compound in accordance with claim 10, wherein $R_3$ is methyl and $R_4$ and $R_7$ are hydrogen, i.e., 1,3,4,5-tetrahydro - 2,8 - dimethyl-5-(α-methyl-3-pyridylmethyl)-2H-pyrido[4,3-b]indole.

15. A compound in accordance with claim 10, wherein $R_3$ is methoxy and $R_4$ and $R_7$ are hydrogen, i.e., 1,3,4,5-tetrahydro - 8 - methoxy-2-methyl-5-(α-methyl-3-pyridylmethyl)-2H-pyrido[4,3-b]indole.

16. A compound in accordance with claim 10, wherein $R_3$ and $R_4$ are methyl and $R_7$ is hydrogen, i.e., 1,3,4,5-tetrahydro-2,7,8-trimethyl-5- (α-methyl-3-pyridylmethyl)-2H-pyrido[4,3-b]indole.

17. A compound in accordance with claim 4, wherein A is

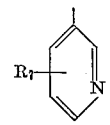

18. A compound in accordance with claim 17, wherein $R_3$ is chloro and $R_4$ and $R_7$ are hydrogen, i.e., 8-chloro- 1,3,4,5 - tetrahydro - 2-methyl-5-(3-pyridylmethyl)-2H-pyrido[4,3-b]indole.

19. A compound in accordance with claim 3, wherein A is

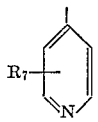

20. A compound in accordance with claim 19, wherein $R_3$ is chloro and $R_4$ and $R_7$ are hydrogen, i.e., 8-chloro-1,3,4,5 - tetrahydro - 2 - methyl - 5-(α-methyl-4-pyridylmethyl)-2H-pyrido[4,3-b]indole.

21. A compound in accordance with claim 4, wherein A is

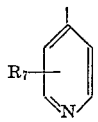

22. A compound in accordance with claim 21, wherein $R_3$ is chloro and $R_4$ and $R_7$ are hydrogen, i.e., 8-chloro-1,3,4,5 - tetrahydro - 2-methyl-5-(4-pyridylmethyl)-2H-pyrido[4,3-b]indole.

23. A compound in accordance with claim 1, wherein $R_1$, $R_2$, $R_3$ and $R_6$ are methyl; $R_4$ and $R_5$ are hydrogen, and A is

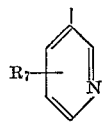

wherein $R_7$ is hydrogen, i.e., 1,3,4,5-tetrahydro-2,8,9-trimethyl - 5 - (α - methyl-3-pyridylmethyl)2-H-pyrido[4,3-b]indole.

References Cited

UNITED STATES PATENTS 2,786,059   3/1957   Horlein _____ 260—296

OTHER REFERENCES

Kost et al.: Chem. Abstracts, vol. 58, Par. 7917–18 (1963).

HENRY R. JILES, Primary Examiners

A. L. ROTMAN, Assistant Examiner

U.S. Cl. X.R.

260—295; 424—263